UNITED STATES PATENT OFFICE.

ISAAC McCORD, OF HARRISBURG, PENNSYLVANIA.

IMPROVEMENT IN THE MODE OF MANUFACTURING ROUND FLEXIBLE WIRE ROPE FOR STEERING VESSELS AND OTHER PURPOSES.

Specification forming part of Letters Patent No. 1,219, dated July 6, 1839.

*To all whom it may concern:*

Be it known that I, ISAAC McCORD, of the borough of Harrisburg, in the State of Pennsylvania, have invented a new and Improved Mode of Manufacturing Round Flexible Wire Rope, which may be employed as tiller-rope in the steering of vessels and for other purposes where such flexible rope may be required; and I do hereby declare that the following is a full and exact description thereof.

For the purpose of making wire rope suitable for tiller-rope, I take iron wire of the size of from No. 27 to No. 30, selecting that of the best quality, and this I anneal in a covered vessel, to protect it from the action of the atmosphere, in the usual way of conducting that process. I have at the same time prepared a suitable vessel containing purified train-oil, which I heat to a temperature of from 200° to 300° Fahrenheit's scale, and when the iron has been brought to a red heat I immerse it in the heated train-oil and suffer it to cool in that situation. The effect of this process is to give to each of the wires a complete coating of a bright tenacious varnish, which not only protects it from rust, but gives it much greater flexibility than is possessed by iron wire prepared in any other known way. I have essayed flaxseed and other oils in the same way without attaining the same end in an equal degree. In converting the wire thus prepared into tiller-rope I take about sixty wires of the requisite length, usually from two to three hundred feet, and then I extend them out in a straight line, giving them an equal degree of tension. This constitutes one strand of my rope. I take three such strands and attach them to a hook on a machine similar to that for laying hemp rope, and I also employ a "top" or grooved frustum of a cone for laying my wire rope, in a manner similar to the laying of hemp rope; but it is a point of great importance in the manufacturing of round wire rope that there be no twist whatever in the separate strands, and such twist would be given to them in the ordinary process of laying. To prevent this I connect each of the strands at their ends opposite to that where the laying commences to three separate hooks on a wheel or apparatus used for twisting and laying ropes, and which is well known, and by means of this I give a counter-twist to the strands during the whole operation of laying to such extent as shall keep the wires in each strand in a straight line or parallel to each other, continuing this operation until the laying is completed.

I have mentioned the using of three strands for making my rope; but a larger number may be used, if preferred. A rope of four strands will be more perfectly round than one of three; but from the same quantity of material the latter will have the greatest strength.

Having thus fully described the manner in which I manufacture my round flexible wire rope, what I claim as my invention, and desire to secure by Letters Patent, is—

The employment of heated train-oil in the process of annealing and coating the wire in the manner above set forth, and also the keeping of the wires of each strand without twist in the operation of laying by giving to them a counter-twist, as above described.

I. McCORD.

Witnesses:
 THOS. P. JONES,
 GEORGE WEST.